United States Patent
Bolitsky et al.

(10) Patent No.: US 6,187,127 B1
(45) Date of Patent: Feb. 13, 2001

(54) VENEER TAPE AND METHOD OF USE

(75) Inventors: Robert E. Bolitsky; Richard B. Hartman, both of Woodbury, MN (US)

(73) Assignee: 3M Innovative Properties Company, St. Paul, MN (US)

(*) Notice: Under 35 U.S.C. 154(b), the term of this patent shall be extended for 0 days.

(21) Appl. No.: 09/268,218

(22) Filed: Mar. 15, 1999

(51) Int. Cl.$^7$ .................. C09J 7/02; B44C 1/10; B29C 65/00; B32B 21/00; E04F 13/08
(52) U.S. Cl. .................. 156/247; 156/230; 156/238; 156/289; 156/304.1; 156/344; 428/352; 144/347; 52/391; 52/746.12; 249/15
(58) Field of Search .................. 156/63, 157, 163, 156/230, 238, 247, 253, 289, 304.1, 344; 428/343, 352, 541; 144/332, 344, 347, 348, 352; 52/384, 390, 391, 392, 746.12; 249/15

(56) References Cited

U.S. PATENT DOCUMENTS

| | | | |
|---|---|---|---|
| 3,542,717 | 11/1970 | Lipman | 260/27 |
| 3,635,755 | 1/1972 | Balinth et al. | 117/122 |
| 3,900,645 | 8/1975 | Morgan | 428/41 |
| 4,181,752 | 1/1980 | Martens et al. | 427/54.1 |
| 4,196,254 | 4/1980 | Puskadi | 428/341 |
| 4,310,137 | 1/1982 | Frye | 248/467 |
| 4,374,883 | 2/1983 | Winslow | 428/40 |
| 4,379,201 | 4/1983 | Heilmann et al. | 428/345 |
| 4,554,193 | 11/1985 | Erickson | 428/40 |
| 4,837,088 | 6/1989 | Freedman | 156/243 |
| 4,925,714 | 5/1990 | Freedman | 428/40 |
| 4,942,071 | 7/1990 | Frye | 428/40 |
| 5,112,882 | 5/1992 | Babu et al. | 522/158 |
| 5,209,971 | 5/1993 | Babu et al. | 428/343 |
| 5,266,399 | 11/1993 | Babu et al. | 428/343 |
| 5,612,136 | 3/1997 | Everaerts et al. | 428/355 |
| 5,702,555 | 12/1997 | Caudal et al. | 156/247 |
| 5,711,124 | * 1/1998 | Stough et al. | 52/417 |
| 5,728,246 | 3/1998 | Ewaschuk | 156/211 |
| 5,846,653 | 12/1998 | Hawkins | 428/353 |
| 6,048,431 | 4/2000 | Clements et al. | 156/247 |

FOREIGN PATENT DOCUMENTS

| | | |
|---|---|---|
| 1110201 | 4/1968 | (GB). |
| 1278168 | 6/1972 | (GB). |
| 97/23576 | 7/1997 | (WO). |
| 98/55280 | 10/1998 | (WO). |

OTHER PUBLICATIONS

Issuance entitled "Glossary of Terms Used in the Pressure Sensitive Tape Industry" by Pressure Sensitive Tape Council, dated Oct., 1963, revised Jul.14 and Aug. 85.

Manual entitled The Complete Manual of Wood Veneering, by W.A. Lincoln, printed in the United States of America, First Linden Publishing Edition 1995, © 1984 W.A. Lincoln, pp. 99–119, 166–171, 278–283.

Manual entitled A Manual of Veneering by Paul Villiard, Copyright© 1975 by Dover Publications, Inc., Copyright© 1968 by Paul Villiard, pp. 80–89.

* cited by examiner

*Primary Examiner*—Richard Crispino
*Assistant Examiner*—J. A. Lorengo

(57) ABSTRACT

Veneer tape for temporarily joining pieces of veneer to be bonded to a substrate, for example, core board. The present invention also provides a method of forming a veneer assembly.

20 Claims, 1 Drawing Sheet

VENEER TAPE AND METHOD OF USE

TECHNICAL FIELD

The present invention relates to veneer tape for temporarily joining pieces of veneer to be bonded to a substrate, for example, core board. More particularly, the present invention relates to veneer tape that, after bonding the veneer to the substrate, the tape backing can be pulled from the veneer, leaving all or a substantial amount of the layer of adhesive on the veneer and to methods of using such tape.

BACKGROUND OF THE INVENTION

A variety of tapes are used in the furniture industry in the assembly of composite wood panels having veneered surfaces. Complex versions of these composite wood panels are known as "fancy face" veneered surface panels. The current practice in the furniture industry is to assemble furniture with thin wooden veneers covering a dimensionally stable, but cheaper core board, such as particle board. The decorative wood species desired by consumers, such as oak, maple, cherry, and others, are expensive and thus are most commonly used in the form of thin veneers about 0.8 mm (0.03 in) thick. These veneer pieces are often arranged in a side-by-side relationship and fastened together to form a composite panel or veneer surface.

Taping the face of the veneers is a critical part of the entire operation of veneering. It is at this point that the individual veneer portions are assembled into composites, thus determining the quality of the composite wood panel.

A typical method used to tape the faces of the veneer employs a non-pressure sensitive adhesive tape having a water-activated gum adhesive on a kraft paper backing. A worker pulls the gum side of the tape across a wetted sponge where it picks up enough moisture to become tacky. The worker then applies the tape to one of the veneers to be joined, and uses the free end of the tape to pull that piece into edge contact with a second piece. The tape is then rubbed down onto the second piece, and the process is repeated until the full surface is completed. As the gum of the tape loses water it becomes non-tacky, and forms a secure, permanent bond with the wood and the other layers of tape.

Many small pieces of tape may be required to hold the pieces of surface veneer in place on a typical piece of furniture. Consequently, there may be spots where multiple layers of tape exist. Five to seven tape layers are common for some fancy faces. This is particularly the case where the joined veneers are small, the design is intricate, and mitered corners are made.

After the individual veneer portions are assembled in a pattern, it is bonded to the core board. The core board is run through a roll coater that applies glue to the surface of the board. The taped veneer assembly is positioned on the glued board and then pressed to the board, using either a cold press or a hot press. If a cold press is used, the glue is commonly a water-based vinyl type, which typically cures at or slightly above normal room temperature. For a hot press, the glue is typically synthetic resins, often supplied with various resin and catalyst combinations, or a urea formaldehyde type of glue. Cold press conditions generally are in excess of 100 psi for 45 minutes to 48 hours at room temperature (68° F.). Hot press conditions typically range from a minimum of 30 seconds to 10 minutes at temperatures in the range of 250° F. to 325° F. at 75 psi to 250 psi.

After coming out of the press, the parts are sanded to remove the gummed adhesive tape from the exposed face of the veneer. Because the tape has formed a permanent bond to the wood, it must be sanded off of the veneer surface. Aggressive cross-grain sanding removes most of the tape. During this sanding step, the gummed adhesive tape backings clog the sanding belts increasing expense and finishing time. After cross-grain sanding, the parts typically go through three more sanding steps to prepare the surface for staining and varnishing. Waste also occurs when the water used to moisten the water-activated gum adhesive on the veneer tapes causes the adhesive to sink deep into the pores of the wood requiring additional sanding. In addition, the water used to moisten the water-activated gun adhesive causes the veneer to warp, creating the potential for more waste. There is significant waste associated with the process in which veneers are taped together with a water-activated paper tape, which is undesirable.

Common masking tapes are usually not recommended for joining veneers into composites because such tapes tend to leave behind a residue, which will form into balls and pull fibers from the veneer if sanded. Additionally, common masking tapes have backings with low delamination resistance, usually less than the strength between the adhesive to the backing. Delamination resistance is the measure of force in the thickness or z-direction of the tape backing required to split the tape backing into two pieces. Because of their low delamination resistance, the backings of common masking tapes do not release from the veneer in one piece after the pressing stage, but rather come off in little slivers.

PCT publication WO 98/55280 (Clements et al.), published on Dec. 10, 1998, discloses a cleanly removal veneer tape. This tape is cleanly removable from the substrates following the lamination process. The tape is capable of leaving less than 10% of the adhesive on the veneer after the tape is removed.

SUMMARY OF THE INVENTION

The present invention provides a method of forming a veneer assembly. The method includes the steps of: a) aligning a first piece of veneer adjacent a second piece of veneer; b) applying a veneer tape having a backing and a layer of adhesive disposed on the backing to the juncture between the first piece of veneer and the second piece of veneer so as to form a veneer assembly; c) bonding the veneer assembly to a substrate; and d) thereafter peeling the backing of the tape from the veneer assembly while a substantial amount of the layer of adhesive remains on the veneer assembly. In one preferred embodiment of this method, the method further including the step of: e) sanding adhesive from the veneer assembly.

In another preferred embodiment of the above method, the tape backing includes a first major surface, a second major surface opposite the first major surface, and where the layer of adhesive is disposed on the second major surface of the backing for bonding the tape to the veneer, where after step c), the layer of adhesive includes a cohesive strength, and where the cohesive strength is such that upon peeling of the backing from the veneer in step d) the layer of adhesive undergoes cohesive separation. In another aspect of this embodiment, step d) includes leaving 30–70% of the layer of adhesive on the veneer assembly. In yet another preferred embodiment of the above method, step d) includes peeling the entire backing in substantially one piece. In still another preferred embodiment, the tape backing includes a delamination strength, and where the delamination strength is greater than the cohesive strength of the layer of adhesive.

In yet another preferred embodiment of the above method, step d) includes peeling the backing of the tape from the veneer assembly while substantially all of the layer of adhesive remains on the veneer assembly. In another aspect of this embodiment, step d) includes leaving at least 90% of the layer of adhesive on the veneer assembly. In another aspect of this embodiment, the tape backing includes a first major surface, a second major surface opposite the first major surface, and where the layer of adhesive is disposed on the second major surface of the backing for bonding the tape to the veneer with a first adhesive strength, where the layer of adhesive is bonded to the second major surface of the backing with a second adhesive strength, where the layer of adhesive includes a cohesive strength, and where after step c): 1) the cohesive strength is greater than second adhesive strength; and 2) the first adhesive strength is greater than the second adhesive strength. In another aspect of this embodiment, step d) includes peeling the entire backing substantially in one piece. In another aspect of this embodiment, the tape backing includes a delamination strength and where the delamination strength is greater than the second adhesive strength of the layer of adhesive.

In another preferred embodiment of the above method, the layer of adhesive of the veneer tape comprises poly(alpha-olefin) adhesive. In yet another preferred embodiment, the layer of adhesive of the veneer tape comprises an acrylic-based adhesive. In another preferred embodiment, the backing of the veneer tape comprises paper. In yet another preferred embodiment, the backing of the veneer tape comprises film.

In yet another preferred embodiment of the above method, the first piece of veneer and the second piece of veneer are selected from a group consisting of oak, maple, pine, cherry, walnut, ash, mahogany, teak, birch and hickory. In another aspect of this embodiment, step c) further includes applying a temperature of 250° to 325° F. to the veneer assembly.

In another preferred embodiment of the above method, step c) further includes applying a pressure of 75–250 psi to the veneer assembly. In another aspect of this embodiment, step c) further includes applying the pressure of 75–250 psi for at least 30 seconds. In yet another preferred embodiment of the above method, prior to step c), the veneer tape is repositionable on the veneer assembly.

The present invention also provides a veneer assembly. The veneer assembly comprises: a) a first piece of veneer; b) a second piece of veneer adjacent the first piece of veneer; and c) a veneer tape bonded to the first piece of veneer and to the second piece of veneer, where the tape includes: i) a backing, including a first major surface and a second major surface opposite the first major surface; and ii) a layer of adhesive disposed on the second major surface of the backing; where the layer of adhesive is selected such that after bonding the veneer assembly to a substrate with an application of either: i) 100 psi for 45 minutes at 68° F.; or ii) 75 psi for 1 minute at 250° F., the bond between the veneer tape and the first piece of veneer and the second piece of veneer is high enough such that upon removing the backing from the veneer assembly, a substantial amount of the layer of adhesive remains on the veneer assembly and where the entire backing is removable in substantially one piece after an application of either: i) 100 psi for 45 minutes at 68° F.; or ii) 75 psi for 1 minute at 250° F., to bond the veneer assembly to a substrate.

In a preferred embodiment of the above veneer assembly, the layer of adhesive includes a cohesive strength, and where after bonding the veneer assembly to the substrate with an application of either: i) 100 psi for 45 minutes at 68° F.; or ii) 75 psi for 1 minute at 250° F., the cohesive strength is such that upon removal of the backing from the veneer assembly the layer of adhesive undergoes cohesive separation. In another preferred embodiment of the above veneer assembly, after bonding the veneer assembly to the substrate with an application of either: i) 100 psi for 45 minutes at 68° F.; or ii) 75 psi for 1 minute at 250° F., upon removal of the backing from the veneer assembly, substantially all of the layer of adhesive remains on the veneer assembly. In another aspect of this embodiment, the layer of adhesive is bonded the first and second pieces of veneer with a first adhesive strength, where the layer of adhesive is bonded to the second major surface of the backing with a second adhesive strength, where the layer of adhesive includes a cohesive strength, and where after bonding the veneer assembly to a substrate with an application of either: i) 100 psi for 45 minutes at 68° F.; or ii) 75 psi for 1 minute at 250° F., a) the cohesive strength is greater than the second adhesive strength; and b) the first adhesive strength is greater than the second adhesive strength.

In another preferred embodiment of the above veneer assembly, the tape backing includes a delamination strength high enough such that when the backing is removed from the veneer assembly, the entire backing is removed substantially in one piece. In yet another preferred embodiment of the above veneer assembly, the layer of adhesive comprises poly(alpha-olefin) adhesive. In another preferred embodiment of the above veneer assembly, the layer of adhesive of the veneer tape comprises an acrylic-based adhesive. In another preferred embodiment of the above veneer assembly, the tape backing of the veneer tape comprises paper. In yet another preferred embodiment of the above veneer assembly, the tape backing of the veneer tape comprises a film. In another preferred embodiment of the above veneer assembly, the veneer tape is initially repositionable on the first and second pieces of veneer. In another preferred embodiment of the above veneer assembly, the first and the second pieces of veneer are selected from the group consisting of oak, maple, pine, cherry, walnut, ash, mahogany, teak, birch and hickory.

The present invention also provides a veneer tape. The veneer tape comprises: a) a unprimed backing including a thickness of 0.001 to 0.005 inches; and b) a pressure sensitive poly(alpha-olefin) adhesive disposed on the backing.

In a preferred embodiment of the above veneer tape, the unprimed backing comprises flat paper. In another aspect of this embodiment, the flat paper includes a thickness of 0.0025 to 0.005 inches. In another preferred embodiment of the above veneer tape, the unprimed backing comprises film. In another aspect of this embodiment, the film includes a thickness of 0.001 to 0.004 inches.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

The present invention relates to veneer tape for temporarily joining pieces of veneer to be bonded to a substrate, for example, core board. More particularly, the present invention relates to veneer tape that, after bonding the veneer to the substrate, the tape backing can be pulled from the veneer, leaving all or a substantial amount of the layer of adhesive on the veneer, and to methods of using such tape. As a result, it is not necessary to sand off the tape backing from the veneer assembly, which eliminates clogging the sanding belt with the tape backings and saves finishing time. Surprisingly, the pressure-sensitive adhesive used with the tape of the present invention does not unacceptably clog the sanding belt. Additionally, the present veneer tape does not require water to activate the adhesive, eliminating the problems caused by water use, namely warping of the veneer and additional process steps. Since a portion of the layer of adhesive stays on the veneer, the fibers are not pulled from the veneer when stripping the tape backing off, eliminating potential non-uniformities in the surface of the veneer caused by the pulling of fibers.

Figure 1:
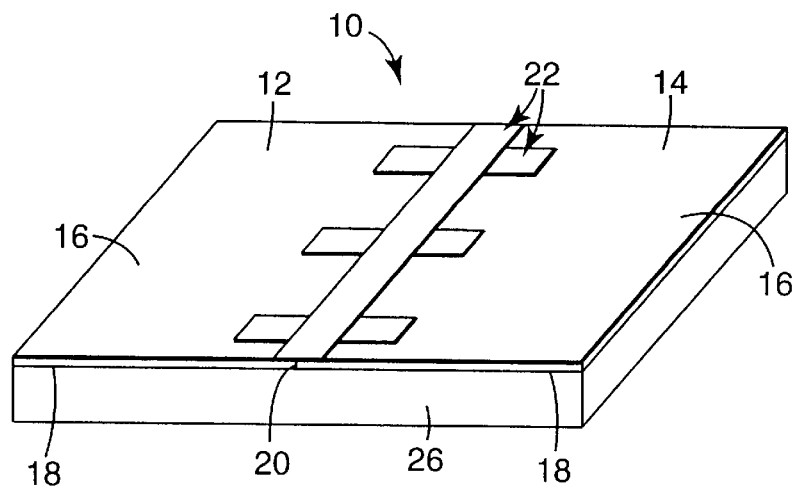
FIG. 1 is an isometric view of a first portion and second portion of veneer taped together with the present inventive tape and bonded to core board.

FIG. 1 illustrates a veneer assembly 10 mounted on a substrate 26 with a layer of glue. Substrate 26 is typically a larger single piece of veneer-like substrate or a thick substrate such as core board. The veneer assembly 10 includes a first piece of veneer 12 and a second piece of veneer 14 abutted and veneer tape 22 holding the first and second pieces of veneer 12, 14 in position. Preferably, the first piece and the second piece of veneer 12, 14 are made of any of a variety of woods, which include, but are not limited to, oak, maple, pine, cherry, walnut, ash, mahogany, teak, birch and hickory. The first and second veneer pieces 12, 14 are assembled for mounting on core board 26. Short pieces of veneer tape 22 are preferably positioned at spaced intervals perpendicular to the juncture 20 to keep the first and second pieces of veneer 12, 14 in together. Additionally, one long piece of veneer tape 22 may overlap the juncture 20 of the ends of the first and second veneer pieces 12, 14, holding the veneer pieces 12, 14 in position. To avoid multiple layers of veneer tape 22, short pieces of veneer tape 22 may overlap junction 20 between adjacent pieces of the veneer tape spaced perpendicular to the junction 20.

As explained in the background, after the veneer assembly 10 has been assembled, it is then positioned and glued to the substrate 26 with a layer of glue. The veneer assembly 10 and substrate 26 undergo a lamination process in a cold-press or hot-press to permanently bond the veneer assembly 10 to the core board 26 selected by those skilled in the art based on the type of adhesive, substrate and veneer used. Cold press conditions generally are in excess of 100 psi for 45 minutes to 48 hours at room temperature (approximately 68° F.). Hot press conditions typically range from a minimum of 30 seconds to 10 minutes at temperatures in the range of 250° F. to 325° F. at pressures of 75 psi to 250 psi. After lamination, the veneer tape backing 30 is removed leaving behind at least a portion of the layer of adhesive 36 on the veneer assembly 10 to be later removed, usually by sanding.

Figure 2:
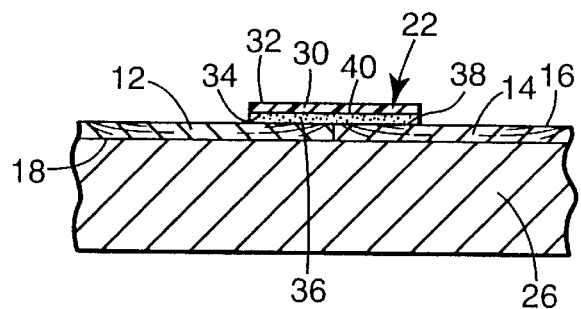
FIG. 2 is an exploded side view of the assembly of FIG. 1, showing the veneer tape bonded to the veneer.

FIG. 2 illustrates an enlarged view of the veneer tape 22 bonded to the first major surface 16 of each of the veneer pieces 12, 14. The first and second pieces of veneer 12, 14 each include a first major surface 16 and a second major surface 18 opposite the first major surface. The veneer tape 22 includes a backing 30 with a first major surface 32 and a second major surface 34 opposite the first major surface 32. A layer of adhesive 36 is disposed on the second major surface 34 of the tape backing 30. The layer of adhesive 36 bonds with the first major surfaces 16 of the veneer pieces 12, 14.

The layer of adhesive 36 includes a first adhesive strength, a second adhesive strength, and a cohesive strength. The first adhesive strength is the strength of the bond between the layer of adhesive 36 and the surface it is adhered to, in this case, the first major surface 16 of the veneer pieces 12, 14, at interface 38. The second adhesive strength is the strength of the bond between the layer of adhesive 36 and the second major surface 34 of the tape backing 30, at interface 40. The cohesive strength of the adhesive is the strength of the adhesive to resist internal delamination such as at 42 (see FIG. 3).

Before the process of laminating the veneer assembly 10 to the core board 26 by means of cold pressing or hot pressing, the veneer tape 22 is preferably repositionable. That is, the first adhesive strength at 38 is less than the cohesive strength and the first adhesive strength at 38 is less than the second adhesive strength at 40. These relationships between the adhesive strengths and the cohesive strength of the adhesive permit the tape to be positioned on the veneer assembly 10 and then lifted off to be repositioned without leaving any adhesive residue behind.

Veneer assemblies 10 are preferably assembled prior to bonding them to substrates, such as core board 26. Preferably, the first pieces of veneer 12 and the second pieces of veneer 14 are aligned to form a composite surface. Preferably the first and second pieces of veneer 12, 14 are aligned without overlap to achieve a minimal gap between the veneer pieces 12, 14. The veneer pieces 12, 14 are then held in position by applying the veneer tape 22 to both pieces 12, 14. One preferred method of joining the veneer pieces 12, 14 together is to apply short pieces of veneer tape 22 at spaced intervals perpendicular to the length of the juncture to keep the veneer pieces 12, 14 in position. Optionally, one long piece of veneer tape 22 may be applied to the juncture 20 between the first piece of veneer 12 and the second piece of veneer 14.

After assembly, the veneer assembly 10 may then be bonded to the substrate 26. Preferably, the veneer assembly is permanently bonded to the substrate 26 with a layer of glue by means of cold pressing or hot pressing. After bonding, the backing 30 is peeled from the veneer assembly 10 while a substantial amount of the layer of adhesive 36 remains on the veneer assembly 10. With the backing 30 removed, portion of the layer of adhesive 36 remaining on the veneer assembly, is removed, preferably by sanding.

Figure 3:
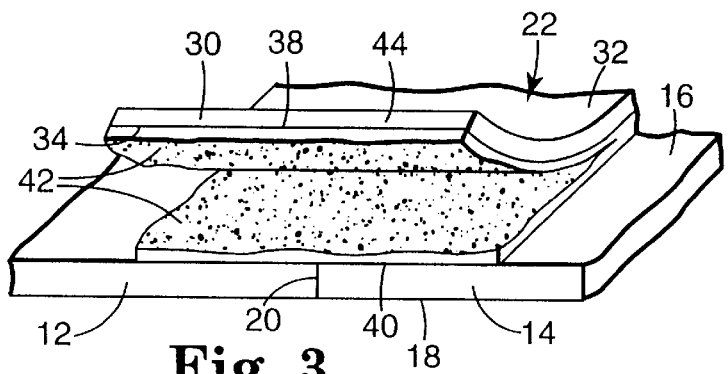
FIG. 3 is an isometric view of a preferred embodiment for removing the veneer tape from the veneer.
Figure 4:
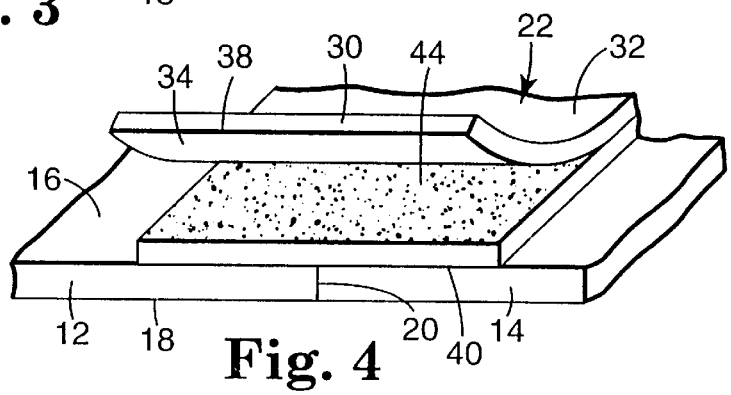
FIG. 4 is an isometric view of another preferred embodiment for removing the veneer tape from the veneer.

After the process of laminating the veneer assembly 10 to the core board 26 by means of cold pressing or hot pressing, the relationships between the first adhesive strength at 38, second adhesive strength at 40, and the cohesive strength of the adhesive change. When the veneer tape backing 30 is pulled from the veneer assembly 10, the tape 22 experiences one of two modes of removal: (1) cohesive separation of the adhesive leaving a substantial portion of the adhesive on both the backing and the veneer; or (2) the tape backing 30 releases from the layer of adhesive 36, leaving all or substantially all of the layer of adhesive 36 on the surface of the veneer pieces 12, 14. Cohesive separation is illustrated in FIG. 3. FIG. 4 illustrates the tape backing 30 releasing from the layer of adhesive 36. The mode of removal depends on the relationships between the first adhesive strength, and the second adhesive strength, and the cohesive strength of the adhesive.

FIG. 3 illustrates cohesive separation of the adhesive when the veneer tape backing 30 is pulled from the veneer assembly 10 after the lamination process. A portion of the layer of adhesive 36 remains on the second major surface 34 of the tape backing 30, while another portion of the layer of adhesive remains on the first major surface 16 of the veneer pieces 12, 14. To obtain cohesive separation of the layer of adhesive 36, the first adhesive strength at 38 is greater than the cohesive strength of the layer of adhesive 36, and the second strength at 40 is also greater than the cohesive strength. In other words, the bond between the layer of adhesive 36 and the tape backing 30 is greater than the cohesive strength of the layer of adhesive 36. The bond between the layer of adhesive and the veneer substrate is also greater than the strength of the layer of adhesive 36 to stay together. These relationships cause the layer of adhesive 36 to split at 42 between the tape backing 30 and the veneer pieces 12, 14. Preferably, 30%–70% of the layer of adhesive 36 remains on the veneer assembly 10. After removal of the tape backing 30 and a portion of the layer of adhesive 36, the first major 16 of the veneer pieces 12, 14 may be sanded to remove the remaining adhesive.

FIG. 4 illustrates the tape backing 30 releasing from the layer of adhesive 36 when the veneer tape backing 30 is pulled from the veneer assembly 10 after the lamination process. To obtain this mode of removal, the second adhesive strength at 40 is less than the first adhesive strength at 38; and the second adhesive strength at 40 is less than the cohesive strength of the adhesive. In other words, the bond between the tape backing 30 and the layer of adhesive 36 is not as strong as the bond between the layer of adhesive 36 and the veneer substrate and not as strong as the cohesive strength of the layer of adhesive 36. Preferably, when the veneer tape 22 is removed from the veneer assembly 10, a substantial amount of the layer of adhesive 36 remains on the veneer assembly 10. More preferably, substantially all of the layer of adhesive 36 remains on the veneer assembly 10. More preferably, at least 90% of the layer of adhesive 36 remains on the veneer assembly 10. Even more preferably, at least 95% of the layer of adhesive 36 remains on the veneer assembly 10. Most preferably, all of the layer of adhesive 36 remains on the veneer assembly 10, but an insignificant amount of adhesive may remain on the tape backing 30.

FIG. 4 illustrates that after the lamination process, the tape backing 30 is removed from the veneer assembly 10 as substantially one piece, which is preferred. More preferably, after the lamination process, the entire tape backing 30 is removed from the veneer assembly 10 in one piece. To maintain the tape backing 30 substantially in one piece when it is separating from the layer of adhesive 36, the tear strength and delamination resistance of the backing 30 must be greater than the second adhesive strength 40, i.e., the delamination resistance of the backing must be greater than the bond between the layer of adhesive 36 and the backing 30. Similarly, during cohesive separation illustrated in FIG. 3, the tear strength and delamination resistance of the backing is preferably greater than the cohesive strength of the layer of adhesive 36.

Preferably, the tape backing 30 is selected to have a sufficiently high tear strength and delamination strength as explained above. One preferred tape backing 30 includes paper. Other preferred tape backings include films such as polyester, nylon, high strength cloth, and filament composites.

Preferably, the tape backing 30 is selected to be strong enough to hold the veneer pieces 12, 14 in position during the process of bonding the veneer assembly 10 to the substrate 26. Preferably, tape backing 30 should be flat and thin enough so as not to adversely indent or mar the veneer surface. Preferably, the thickness of the tape backing 30 is in the range of 0.001 to 0.005 inches. If the tape backing 30 is flat paper, the thickness of the flat paper is preferably in the range of 0.0025 to 0.005 inches. If the tape backing 30 is film, the thickness of the film is preferably in the range of 0.001 to 0.004 inches. A preferred commercially available backing is CTD Flatback (Grade Spec. 2124PO, Type C-91502) from Kimberly Clark Co. located in Roswell, Ga.

The backings 30 can also include a low adhesion backsize material to aid in tape unwind when the tape is provided in the form of a roll. The backsize material is coated on a first surface 32 opposite the surface coated with the adhesive. Useful backsize materials have softening points above about 107° C., in particular above 125° C. Suitable backsize materials can be chosen by one skilled in the art and include well known backsize materials such as, e.g., urethanes, acrylics, and fluorochemicals. Examples of suitable backsize compositions are also disclosed in U.S. Pat. No. 2,607,711 (Hendricks), incorporated herein by reference.

For the mode of release illustrated in FIG. 4, it is preferable that veneer tape 22 does not include a primer between the tape backing 30 and the layer of adhesive 36. In other words, preferably the tape backing 30 is unprimed. This helps promote the release of the tape backing 30 from the layer of adhesive 36 after the lamination process. In some cases, a release-promoting composition or treatment on the tape backing 30 may be desired. For the mode of release illustrated in FIG. 3, it is typically not necessary, but in some circumstances it may be desirable to have a primer or treatment to increase the bond between the backing and adhesive.

The layer of adhesive 36 is chosen such that after an application of either: 1) 100 psi for 45 minutes at 68° F.; or 2) 75 psi for 1 minute at 250° F. to bond the veneer assembly 10 to substrate 26, when the veneer tape backing 30 is pulled from the veneer assembly 10, the tape 22 experiences one of two modes of removal. These two modes of removal include: (1) cohesive separation of the adhesive leaving a substantial portion of the adhesive on both the backing and the veneer; or (2) the tape backing 30 releases from the layer of adhesive 36, leaving all or a substantially all of the layer of adhesive 36 on the surface of the veneer pieces 12, 14. Suitable adhesives for the layer of adhesive 36 include poly (alpha-olefin) adhesives, rubber-based adhesives; and acrylic-based adhesives such as reaction product of an acrylic acid ester and a reinforcing ethylenically unsaturated monomer. One preferable adhesive for the layer of adhesive 36 includes a pressure sensitive poly (alpha-olefin) adhesive.

Suitable adhesive compositions include rubber-based adhesives, acrylic adhesives, and poly(alpha-olefin) adhesives. These adhesive compositions may be modified by manipulating the level of tack and the degree of crosslinking to yield an adhesive composition exhibiting the requisite properties.

Useful rubber-based adhesive compositions include an elastomeric component, a tackifying resin, a crosslinking agent, and an accelerator. The optional crosslinking agents and accelerators are employed as needed in the rubber-based adhesive compositions such that the desired characteristics of the final veneer tape are obtained.

Suitable elastomeric components include, e.g., natural rubbers, synthetic rubbers such as styrene-butadiene rubber, styrene block copolymers such as styrene-isoprene-styrene, styrene-butadiene-styrene, styrene-ethylene/butylene-styrene, and various combinations of such rubbers.

Suitable tackifying resins include resins derived from polymerization of $C_5$ to $C_9$ unsaturated hydrocarbon monomers, terpene resins, and rosin ester resins. Examples of tackifying resins based on a $C_5$ olefin fraction of this type include those commercially available under the trade designations "WINGTACK 95" and "WINGTACK 115" from Goodyear Tire and Rubber Company, Akron, Ohio. Other hydrocarbon based tackifying resins include those commercially available under the trade designations "REGALREZ 1078" and "REGALREZ 1126" from Hercules Chemical Company, Wilmington, Del.; Arkon resins, which include those commercially available under the trade designation "ARKON P115" from Arakawa Forest Chemical Industries, Chicago, Ill.; and resins commercially available under the trade designation "ESCOREZ" from Exxon Chemical Company, Houston, Tex. Suitable terpene resins include terpene polymers, such as polymeric resinous materials obtained by polymerization and/or copolymerization of terpene hydrocarbons such as the alicyclic, monocyclic, and bicyclic monoterpenes and their mixtures. Commercially available terpene resins include those commercially available under the trade designation "ZONAREZ B-Series" and "ZONAREZ 7000 Series" from Arizona Chemical Company, Wayne, N.J. Commercially available rosin ester tackifying resins include those commercially available under the trade designation "FORAL" and "STAYBELITE" from Hercules Chemical Company, Wilmington, Del. The tackifying resin can contain ethylenic unsaturation; however, saturated tackifying resins are preferred for those applications where resistance to oxidation is important. The amount of tackifying resin typically ranges from about 20 parts to about 70 parts by weight per 100 parts of elastomeric component.

Optional crosslinking agents for rubber-based adhesives include phenolic resins such as, for example, alkyl phenolic resins, aryl phenolic resins, and halogenated phenolic resins, e.g., brominated phenolic resin. Examples of suitable phenolic resins and their methods of manufacture are described in U.S. Pat. No. 2,987,420 (Bemmels), incorporated herein by reference. The amount of crosslinking agents may range from about 0 to 30 parts by weight per 100 parts of elastomeric component.

Accelerators may be added to the rubber-based adhesive composition to accelerate crosslinking. Examples of suitable accelerators include zinc salts (e.g., zinc rosinate), tin chloride, and acid accelerators (e.g., stearic acid). The amount of accelerator typically ranges from about 0 to 15 parts by weight per 100 parts of elastomeric component.

Useful acrylic adhesives include those comprising at least one copolymerized monofunctional (meth)acrylic acid ester [(meth)acrylic ester includes acrylic and methacrylic acid esters] of a nontertiary alcohol in which the alkyl group contains about 4 to 14 carbon atoms (on average) whose homopolymer has a Tg (glass transition temperature) of no greater than about 0° C. and at least one copolymerized monofunctional ethylenically unsaturated reinforcing monomer whose homopolymer has a Tg of at least about 10° C. The term "monofunctional" in the context of a "monofunctional (meth)acrylic acid ester" refers to a mono-(meth)acrylic monomer or a monomer containing one (meth)acrylic functionality, although other functionality can be present. The term "monofunctional" in the context of a "monofunctional ethylenically unsaturated reinforcing monomer" refers to a monoethylenically unsaturated monomer or a monomer containing one ethylenically unsaturated functionality, although other functionality can be present. As used herein, "reinforcing monomer" means those that increase the modulus of the adhesive and thereby its strength. The alkyl group of the nontertiary alcohol can optionally contain oxygen atoms in the chain, thereby forming ethers for example.

Examples of suitable monofunctional (meth)acrylic acid esters include, but are not limited to, 2-methylbutyl acrylate, 2-ethylhexyl acrylate, isooctyl acrylate, lauryl acrylate, n-decyl acrylate, 4-methyl-2-pentyl acrylate, isoamyl acrylate, sec-butyl acrylate, and isononyl acrylate. Preferred (meth)acrylic acid esters that can be used include, but are not limited to, 2-ethylhexyl acrylate, isooctyl acrylate, lauryl acrylate, and 2-methylbutyl acrylate.

Monofunctional reinforcing monomers include, but are not limited to, (meth)acrylic acid, a (meth)acrylamide, a (meth)acrylate, an alpha-olefin, a vinyl ether, an allyl ether, a styrenic monomer, or a maleate. Examples of suitable monofunctional reinforcing monomers include, but are not limited to, acrylic acid, methacrylic acid, itaconic acid, maleic acid, fumaric acid, 2-hydroxyethyl acrylate or methacrylate, cyclohexyl acrylate, t-butyl acrylate, phenyl acrylate, isobornyl acrylate, 2-phenoxyethyl acrylate, N-vinyl pyrrolidone, N-vinyl caprolactam, acrylamide, methacrylamide, N-substituted and N,N-disubstituted acrylamides such as N-ethyl acrylamide, N-hydroxyethyl acrylamide, N-octyl acrylamide, N-t-butyl acrylamide, N,N-dimethyl acrylamide, N,N-diethyl acrylamide, and N-ethyl-N-dihydroxyethyl acrylamide. Preferred monofunctional reinforcing monomers include, but are not limited to, acrylic acid, t-butyl acrylate, N,N-dimethyl acrylamide, N-octyl acrylamide, isobornyl acrylate, and 2-phenoxyethyl acrylate. Various combinations of reinforcing monomers can also be employed.

The acrylic adhesives may optionally contain various types of crosslinking agents such as, for example, olefinically unsaturated compounds which in the excited state are capable of abstracting hydrogen, and copolymerizable polyfunctional ethylenically unsaturated monomers. Examples of suitable, optional crosslinking agents include copolymerizable olefinically unsaturated compounds which in the excited state are capable of abstracting a hydrogen such as, for example, p-acryloxy-benzophenone, and copolymerizable polyfunctional ethylenically unsaturated monomers such as, for example, 1,6-hexanediol diacrylate, trimethylolpropane triacrylate, pentaerythritol tetraacrylate, 1,2-ethylene glycol diacrylate and the diacrylate of ethylene oxide modified bisphenol A. Various combinations of crosslinking agents can also be employed.

Poly(alpha-olefin) adhesives suitable for use in the present invention comprise one or more monomer units derived from an alpha-olefin monomer that is a liquid at standard temperature and pressure. The monomer preferably is a $C_5$–$C_{30}$ alpha-olefin, more preferably a $C_6$–$C_{20}$ alpha-olefin, most preferably a $C_6$–$C_{12}$ alpha-olefin. Such monomers optionally can be substituted with conventional substituents that do not interfere with the polymerization of these monomers or with the desired properties of the polymer produced therefrom. The olefin may be linear or branched (i.e., comprising one or more side chains). Common examples include 1-pentene, 1-hexene, 1-heptene, 1-octene, 1-nonene, 1-decene, 1-undecene, 1-dodecene, 1-hexadecene, 1-octadecene, and 4-methyl-1-pentene. Particularly preferred alpha-olefin monomers include 1-hexene and 1-octene. Blends of one or more of these monomers plus a lower (i.e., $C_2$–$C_4$) 1-alkene are also within the scope of the present invention. A full description of a preferred alpha-olefin polymer can be found in U.S. Pat. No. 5,112,882, which is incorporated herein by reference.

The alpha-olefin polymer can be a homopolymer, a random co-, ter-, or tetra-polymer. It can also comprise blocks of homopoly(alpha-olefins) interspersed with monomer units derived from various other copolymerizable monomers. Examples of potentially useful copolymerizable monomers include polyenes such as, for example, the $C_6$–$C_{14}$ alpha,omega-dienes, conjugated dienes, trienes, terpenes, and alkenyl-norbornenes.

The above-described monomers can be polymerized, either in bulk or in one or more inert solvents, in the presence of a catalyst system over a wide range of temperatures, e.g., 0° to 140° C., preferably 30° to 90° C. The amount of catalyst used is preferably in the range of 0.1 to 5 g per kg of monomer. Useful catalyst systems include standard Zn catalysts systems, Zn catalyst systems where the transition metal compound is supported (e.g., on a $MgCl_2$ powder), and Kaminsky-Ewen catalyst systems. All three catalyst systems are well known by those familiar with alpha-olefin polymerizations.

Preferably, the alpha-olefin polymer has a glass transition temperature in the range of −70° to 0° C., more preferably in the range of −60° to −20° C.; an inherent viscosity in the range of 0.4 to 9.0 dL/g, more preferably 0.5 to 6.0 dL/g; and a number average molecular weight in the range of 5,000 to 50,000,000, preferably 50,000 to 5,000,000.

Addition of one or more tackifying resins to the poly (alpha-olefin) can improve tack, lower viscosity, improve coatability, impart heat stability, improve peel adhesion, and enhance shear adhesion (with no concomitant loss of peel adhesion). Where a tackifying resin is used, it can be present in an amount from more than 0 to 150 parts by weight of polymer. Potentially useful tackifying resins which may be used are those described above for use in rubber-based adhesives.

Preferably, the alpha-olefin polymer composition also includes a photocrosslinking agent that is activated by actinic radiation, typically after the polymer is coated. Suitable photocrosslinking agents include, but are not limited to, (a) aldehydes, such as benzaldehyde, chromophore-substituted acetaldehyde, and their substituted derivatives; (b) ketones, such as acetophenone, benzophenone, and their substituted derivatives, which includes those commercially available under the trade designation "SANDORAY 1000" from Sandoz Chemicals, Inc., Charlotte, N.C.; (c) quinones, such as the benzoquinones, anthraquinone, and their substituted derivatives; (d) thioxanthones, such as 2-isopropylthioxanthone and 2-dodecylthioxanthone; and (e) certain chromophore-substituted vinyl halomethyl-sym-triazines, such as 2,4-bis(trichloromethyl)-6-(4-methoxyphenyl)-s-triazine, and 2,4-bis(trichloromethyl)-6-(3,4-dimethoxyphenyl)-s-triazine. Because many such triazines produce HCl upon activation, the addition of a basic compound to the polymeric composition can be beneficial. The photoactive crosslinking agent can be present in a range from about 0.005 to about 2% by weight, preferably from about 0.01 to about 0.5% by weight, more preferably from about 0.05 to 0.15% by weight of the polymer.

Minor amounts of additives also can be included in the adhesive composition of the present invention as described above to provide adhesives for special end uses. Such additives can include pigments, dyes, plasticizers, fillers, stabilizers, UV radiation absorbers, antioxidants, processing oils, and the like. The amount of additive(s) used can vary from 0.1 to 50 weight percent, depending on the end use desired. Any additive(s) used preferably do not significantly absorb radiation near the wavelength of maximum absorption of any photocrosslinker included in the polymer composition.

Adhesive compositions, which are particularly useful in the present invention include pressure sensitive adhesives at room temperature. One well known means of identifying pressure sensitive adhesives is the Dahlquist criterion. This criterion defines a pressure sensitive adhesive as an adhesive with a 1 second creep compliance greater than $1 \times 10^{-6}$ $cm^2$/dyne. (See "Handbook of Pressure Sensitive Adhesive Technology", Donald Sata (Ed.), $2^{nd}$ Edition, p. 172, Van Nostrand Reinhold, New York, N.Y., 1989). Alternatively, since modulus is the inverse of creep compliance, pressure sensitive adhesives may be defined as adhesives having a Young's modulus of less than $1 \times 10^6$ $dynes/cm^2$.) Another well known means of identifying a pressure sensitive adhesive is that it is aggressively and permanently tacky at room temperature and firmly adheres to a variety of dissimilar surfaces upon mere contact without the need of more than finger or hand pressure. (See "Glossary of Terms Used in the Pressure Sensitive Tape Industry" provided by the Pressure Sensitive Tape Council, August, 1985.).

The operation of the present invention will be further described with regard to the following detailed examples. These examples are offered to further illustrate the various specific and preferred embodiments and techniques. It should be understood, however, that many variations and modifications may be made while remaining within the scope of the present invention.

Sample Preparation

Taped veneer constructions were prepared and conditioned prior to evaluation. More specifically, a piece of tape measuring 12 inches by 0.75 inches (30.5×1.9 cm) was adhered lengthwise and centered on a piece of veneer (used as obtained from supplier) measuring 4 inches by 1.5 inches (10.2×3.8 cm). The tape strip was positioned such that 4 inches (10.2 cm) of the tape overlapped the veneer along the length (grain) direction of the veneer. The remaining length of tape strip was folded back onto itself so that the adhesive surfaces met. This was then rolled down using 1 pass of a 15 pound (6.8 kg) rubber roller at a rate of about 12 inches per minute (30.5 cm/min.). This folded over and mated section of tape was folded over on itself again and stapled together to provide a looped tab. The samples were then exposed to one of four conditions. After conditioning the samples were evaluated for peel adhesion strength and failure mode.

The four conditions employed were as follows (for Conditions C and D the press was preheated to temperature):
Condition
  A at least 24 hours at 70° F. (+/−2°) and about 50% (+/−5%) Relative Humidity.
  B Condition A followed by pressing for 45 minutes at room temperature and a load of 6500 pounds, which corresponded to a pressure of 361 pounds per square inch (psi) based on the total area of the veneer sample. For all the wood types, except pine, 3 samples were placed side by side during the press cycle. For pine, each sample was pressed individually resulting in a pressure of 1083 psi. The samples were then stored for at least 24 hours at 70° F. (+/−2°) and about 50% (+/−5%) Relative Humidity prior to testing.
  C Condition A followed by pressing for 2.5 minutes at 275° F. and a load of 4500 pounds which corresponded to a pressure of 750 psi based on the total area of the veneer sample. The samples were then removed from the hot press. For all the wood types each sample was pressed individually. The samples were stored for at least 24 hours at 70° F. (+/−2°) and about 50% (+/−5%) Relative Humidity prior to testing.

D Condition A followed by pressing for 7.0 minutes at 325° F. and a load of 4500 pounds which corresponded to a pressure of 750 psi based on the total area of the veneer sample. The samples were then removed from the hot press. For all the wood types each sample was pressed individually. The samples were then stored for at least 24 hours at 70° F. (+/−2°) and about 50% (+/−5%) Relative Humidity prior to testing.

One or more of the following wood veneer types were employed: Ash, Birch, Cherry, Hickory, Mahogany (Philippine), Maple, Oak (White), Pine, Teak, and Walnut. All except pine were 0.031 inches thick with a paper backing. The pine veneer was obtained as a 0.031 inch thick veneer on each side of a 0.19 inch (4.8 mm) thick core of expanded wood fibers.

Peel Adhesion Test

Taped veneer samples were evaluated, following conditioning, for both peel adhesion strength and failure mode using a 180° angle peel test. More specifically, a veneer sample having a veneer tape strip of the invention adhered to it was attached to the movable glass substrate of an IMASS Model 3M90 Peel Tester (Instrumentors, Inc., Strongsville, Ohio) by means of two pieces of 3M™ Brand Masking Tape No. 56, each having a width of 0.5 inches and a length of about 6 inches. One piece of masking tape was positioned and centered on each side of the veneer tape strip such that half the masking tape width was adhered to the untaped, exposed veneer surface and half its width was adhered to the glass substrate. The masking tape was rubbed down using finger pressure to ensure intimate contact. The looped tab of the veneer tape was folded back at an angle of 180° and attached to the load cell (0–67 oz. (0–18.7 N) capacity) of the peel tester. The tape strip was peeled off the wood veneer surface, at an angle of 180° and a rate of 12 inches (304.8 mm) per minute. Data was collected for a period of 25 seconds inches (6.3 cm) of the veneer surface was uncovered. The results were normalized to a width of 1 inch (25.4 mm). For each example, one veneer sample (having one strip of veneer tape) was run and the results used to calculate the reported average peel adhesion strength in oz./inch width (N/mm), with the following exception. Where the veneer tape sample was 1 inch (25.4 mm) wide, normalization was not carried out. For each measurement the removal mode was also observed and categorized as follows:

Removal Mode t=transfer upon peeling, the veneer tape backing came off leaving substantially all the adhesive on the veneer. The samples exhibiting this mode of removal represented one preferred embodiment of the present invention.

c=cohesive upon peeling, a portion of the layer of the adhesive remained on the veneer and a portion of the layer of the adhesive remained on the tape backing, i.e., the adhesive separated cohesively. The samples exhibiting this mode of removal represented one preferred embodiment of the present invention.

a=adhesive upon peeling, the adhesive removed cleanly from the veneer substrate.

p=picking upon peeling, the tape came off the veneer and pulled wood fibers with it, which is undesirable.

d=delamination upon peeling, the backing delaminated, that is, failed internally, resulting in a layer of backing being removed and a layer of backing being left on the adhesive which was still on the veneer, which is undesirable. In this case, no peel adhesion strength is reported.

For some samples, there was only slight ("sl") or very slight ("vsl") picking which is acceptable. Where there was more than one mode of failure, all are reported with the first one given being the major mode of removal.

EXAMPLE 1

A veneer tape of the invention having a natural rubber adhesive was prepared and evaluated as follows. To a 1 quart (0.946) liters) glass jar were added 60 parts by weight (pbw) of Foral™ 105 (available from Hercules Chemical Company, Wilmington, Del.), a compounded mixture of 100 pbw of CV-60 (a natural rubber available from Goodyear Tire & Rubber Company, Akron, Ohio) and 10 pbw of Grade 100 Zinc Oxide (available from Elementis Specialties, Birtley, County Durham, England) and 510 pbw of toluene. This was placed on a shaker for 24 hours to give a uniform dispersion. The resulting mixture was handspread at a rate of about 5 feet per minute (fpm) (1.5 meters per minute) onto the low adhesion backsize (LAB) treated side of 0.004 inch (0.10 mm) thick crepe paper backing (available as C1312 from Kimberly-Clark Company, Roswell, Ga.) by means of a knife-over-bed coater having a gap setting of 0.010 inches (254 μm), and dried for 5 minutes at 180° F. (82° C.) to give a tape of the invention having an adhesive coating weight of 55.5 grams/meter$^2$ (g/m$^2$). This was evaluated as described in "Sample Preparation" and "Peel Adhesion Test" above. The results are shown in Table 1.

EXAMPLE 2

A commercially available tape having a pressure sensitive hot melt rubber resin on biaxially oriented Scotchpar™ polyester film was evaluated. More specifically, 3M™ Scotch™ Brand No. 355 Superior Performance Boxing Tape (available from 3M Company, St. Paul, Minn.) was tested as described in the "Sample Preparation" and "Peel Adhesion Test" above with the following modification. The tape samples had a width of 1 inch (25.4 mm) and two measurements were run on the veneer tape test strip. For each measurement, data was collected for a period of 10 seconds during which 1 inch (2.5 cm) of the veneer surface was uncovered. The results are shown in Table 1.

EXAMPLE 3

A veneer tape of the invention having a poly(alpha-olefin) adhesive was prepared and evaluated. Specifically, 78 pbw of poly(1-octene) prepared as described in U.S. Pat. No. 5,644,007 and having an inherent viscosity (IV) of 1.6 dL/g (as measured in toluene at about 82° F. (28° C.) at a concentration of 0.1 grams/dL using a #100 Cannon-Fenske viscometer tube) and a polydispersity index of about 4.3 (as measured in toluene at 82° F. (28° C.) at a concentration of 0.25 grams/dL using polystyrene calibration standards), 22 pbw of Arkon™ P115 hydrocarbon tackifying resin (available from Arakawa Forest Chemical Industries, Chicago, Ill.), and 0.125 pbw of 2,4-bis(trichloromethyl)-6-(4-methoxyphenyl)-sym-triazine photoinitiator were mixed together using a Plasticorder™ mixer (available from C. W. Brabender Instruments, Inc., South Hackensack, N.J.) and a Rheomix Model 3000 bowl (available from Haake, Inc., Saddlebrook, N.J.). The two bowl plates were both set at 302° F. (150° C.), and the mixing speed was set at 25 revolutions per minute (rpm). After preheating the bowl plates to 302° F. (150° C.), the poly(1-octene) was added first (t=0 minutes) and after mixing for 2 minutes (t=2 minutes) the hydrocarbon tackifying resin was added slowly over a period of 1 minute. Then a t=3 minutes the photoinitiator was added and the composition mixed for an additional 4 minutes.

After cooling to room temperature the adhesive composition was extruded using a Haake single screw extruder between a 0.003 inch (76.2 $\mu$m) thick silicone-treated paper release liner (which was introduced around an upper rubber roller) and a 0.004 inch (102 $\mu$m) thick SBR (styrene-butadiene rubber) saturated flatback paper backing (available as CTD Flatback Grade Spec 2124PO, Type C-91502 from Kimberly-Clark Company, Roswell, Ga.) (which was introduced around the lower, chrome roll) to give a coating weight of 20.1 g/m$^2$. The paper backing had been previously coated on one side with a conventional solvent based acrylic low adhesion backsize layer. The extrudate was coated, on the side of the paper backing opposite that having the low adhesion backsize layer, at a coating weight of 0.8 g/m$^2$. The resulting tape with liner was then wound up and stored for further processing.

Next, the coated tape was unwound, the paper release liner removed and the adhesive crosslinked by exposure, under a nitrogen atmosphere, to 311 milliJoules/centimeter$^2$ (mJ/cm$^2$) of energy (in National Institute of Standards and Testing (NIST) units), as measured by a UVIMAP™ Model UM365L-S sensing device available from Electronic Instrumentation and Technology, Inc.; Sterling, Va. under the trade designation "UVIMAP Model UM365L-S") (the calibration standard for UV energy was MIL-STD-45662A), using two medium pressure, high intensity mercury lamps to give a tape of the invention. This was evaluated as described in "Sample Preparation" and "Peel Adhesion Test" above with the following modification. Three measurements each were made on each of three samples to obtain a total of nine data points which were used to calculate the average peel adhesion strength reported. For each measurement, data was collected for a period of 10 seconds during which 1 inch (2.5 cm) of the veneer surface was uncovered. The results are shown in Tables 2–4.

EXAMPLE 4

A veneer tape of the invention having an acrylic adhesive comprising the reaction product of an acrylic acid ester and an ethylenically unsaturated reinforcing monomer was prepared and evaluated. First, a polyethylene plastic bag having a zipper-like closure at one end obtained from Com-Pac International, Carbondale, Ill., which took polyethylene plastic film (available under the trade designation "VA-24" from Consolidated Plastics, Schaumberg, Ill.) and formed it into bags by heat sealing means and attached a zipper-like closure to each bag) and measuring 2×5 inches (5.1×12.7 cm) was heat sealed 2.2 inches (5.5 cm) in from the bottom edge. Next, 227.8 pbw butyl acrylate, 244.2 pbw 2-ethylhexyl acrylate, 25 pbw acrylic acid, 1.5 pbw isooctyl acrylate, 0.75 pbw photoinitiator (available from Ciba-Geigy, Inc., Hawthorne, N.Y. under the trade designation "IRGACURE 651"), 0.5 pbw 2-acryloxy-benzophenone and 0.25 pbw isooctyl thioglycolate were combined to give a polymerizable mixture. Seventeen grams of this polymerizable mixture was introduced into the plastic bag and the top edge heat sealed 1 inch (2.5 cm) in from the zipper closure at the top edge. Twenty-eight of these bags were attached to each other and, while being passed through a water bath maintained at 61° F. (16° C.), were exposed to ultraviolet (UV) radiation from lamps having 90% of their emission between 300 and 400 nm and a peak emission at 351 nm. The bags were irradiated for a period of 8.5 minutes at an average intensity of 3.5 mW/cm$^2$ to give a total UV energy exposure of 1785 mJ/cm$^2$ (intensity and energy exposure are in NIST units) as measured by the sensing device available under the trade designation "UVIMAP 365."

After irradiation, the bags were slit open and 25 grams of adhesive polymer were combined with 75 grams of toluene in a container which was then sealed and placed on a shaker for 24 hours to give an adhesive solution. This solution was used to coat, by means of a knife-over-bed coater having a gap setting of 0.010 inches (254 $\mu$m), at a rate of about 5 fpm (1.5 meters per minute) the untreated side of a cast polypropylene backing having a thickness of approximately 0.002 inches (50.8 $\mu$m). The backing had been previously treated on the opposite side with a conventional solvent-based acrylic low adhesion backsize layer. The solution coated backing was dried for 5 minutes at 180° F. (82° C.) to give a tape having a coating weight of 45.3 g/m$^2$. This tape was further irradiated using two medium pressure, high intensity mercury lamps as described in Example 3 to give a tape of the invention. This was evaluated as described in "Sample Preparation" and "Peel Adhesion Test". The results are shown in Table 5.

EXAMPLE 5

The coating and drying of the adhesive solution of Example 4 was repeated with the following modification. Biaxially oriented polypropylene (available as Labelmate™ LM-20 from Mobil Oil Company, Pittsburgh, Pa.) having a thickness of approximately 0.002 inches (50.8 $\mu$m) and a silicone release treatment on one side was used as the backing. The adhesive was coated on the side that was not silicone treated. A tape having 41.5 g/m$^2$ was obtained. This tape was further irradiated using two medium pressures, high intensity mercury lamps as described in Example 3 to give a tape of the invention. This was evaluated as described in "Sample Preparation" and "Peel Adhesion Test". The results are shown in Table 5.

EXAMPLE 6

Sealed plastic bags containing adhesive polymer, prepared as described in Example 4, were extruded (after removing the zipper closure) onto the same type of backing as used in Example 3 as described therein. The adhesive was coated onto the side opposite that having the low adhesion backsize coating. A tape having a coating weight of 26.4 g/m$^2$ was obtained. This tape was further irradiated using two medium pressure, high intensity mercury lamps as described in Example 3 to give a tape of the invention. This was evaluated as described in "Sample Preparation" and "Peel Adhesion Test". The results are shown in Table 5.

TABLE 1

| Ex | Condition | Cherry Peel Strength | Cherry Removal Mode | Maple Peel Strength | Maple Removal Mode | Oak Peel Strength | Oak Removal Mode | Pine Peel Strength | Pine Removal Mode |
|---|---|---|---|---|---|---|---|---|---|
| 1 | A | 43.3 | a | 51. | a | 45.5 | a,p | 42.8 | a |
| 1 | B | — | * | — | * | — | * | 58.3 | c |
| 1 | C | 39.9 | c | 31.1 | c | 31.9 | c | 48.7 | c |
| 1 | D | 28.5 | c | 20.9 | c | 15.1 | c | 37. | c |
| 2 | B | 67.5 | p | 67.0 | a | 69.4 | p | NT | NT |
| 2 | C | 5.6 | t | 28.4 | t | 43.1 | t | NT | NT |
| 2 | D | 2.1 | t | 2.4 | t, c | 18.8 | c | NT | NT |

\* = backing tore, unable to obtain peel strength values (—)
NT = not tested

TABLE 2

| Ex. | Condition | Cherry Peel Strength | Cherry Removal Mode | Maple Peel Strength | Maple Removal Mode | Oak Peel Strength | Oak Removal Mode | Pine Peel Strength | Pine Removal Mode |
|---|---|---|---|---|---|---|---|---|---|
| 3 | A | 54.2 | slp | 54.2 | a | 44.9 | slp | 44.0 | c |
| 3 | B | 51.2 | c | 49.8 | c | 46.9 | slp, c | 52.7 | c |
| 3 | C | 38.3 | c | 38.1 | c | 39.9 | vslp, c | 36.6 | c |
| 3 | D | 41.1 | c | 34.8 | c | 43.0 | vslp, c | 32.8 | c |

TABLE 3

| Ex. | Condition | Ash Peel Strength | Ash Removal Mode | Birch Peel Strength | Birch Removal Mode | Hickory Peel Strength | Hickory Removal Mode | Mahogany Peel Strength | Mahogany Removal Mode |
|---|---|---|---|---|---|---|---|---|---|
| 3 | A | 43.0 | a | 43.0 | a | 42.0 | a | 51.6 | slp |
| 3 | B | 42.8 | c | 52.0 | c | 47.0 | c | 52. | slp, c |
| 3 | C | 34.7 | c | 29.2 | c | 33.3 | c | 30.5 | vslp, c |
| 3 | D | 30.4 | c | 34.9 | c | 36.7 | c | 32.7 | vslp, c |

TABLE 4

| Ex. | Condition | Teak Peel Strength | Teak Removal Mode | Walnut Peel Strength | Walnut Removal Mode |
|---|---|---|---|---|---|
| 3 | A | 34.8 | p | 44.5 | p |
| 3 | B | 43.0 | p, c | 49.0 | slp, c |
| 3 | C | 33.5 | vslp, c | 37.6 | vslp, c |
| 3 | D | 31.6 | c | 33.7 | c |

TABLE 5

| Ex | Condition | Cherry Peel Strength | Cherry Removal Mode | Maple Peel Strength | Maple Removal Mode | Oak Peel Strength | Oak Removal Mode | Pine Peel Strength | Pine Removal Mode |
|---|---|---|---|---|---|---|---|---|---|
| 4 | A | 47.6 | a | 46.3 | a | 42.8 | a | 47.5 | slc |
| 4 | B | 62.7 | t, c | 52.1 | t, p | 65.5 | t, c | 69.7 | t, c |
| 4 | C | 41.3 | t | 43.3 | t, c | 55.7 | t | 37.1 | t |
| 5 | A | 40.8 | slp | 28.7 | t | 35.6 | a | NT | NT |
| 5 | B | 19.6 | t | 23.6 | t, p | 20.9 | t | 59.5 | t, c |

TABLE 5-continued

|    |           | Cherry         |               | Maple          |               | Oak            |               | Pine           |               |
|----|-----------|----------------|---------------|----------------|---------------|----------------|---------------|----------------|---------------|
| Ex | Condition | Peel Strength  | Removal Mode  | Peel Strength  | Removal Mode  | Peel Strength  | Removal Mode  | Peel Strength  | Removal Mode  |
| 5  | C         | 11.3           | t             | 7.3            | t, c          | 14.5           | t             | 14.0           | t             |
| 6  | D         | *              | t             | 76.7           | d, t          | 74.7           | t             | 69.0           | p             |

NT = not tested
* = peel force exceeded load cell capacity, testing discontinued The examples demonstrate that certain adhesives, backings and treatments of the backings worked well depending on the press conditions. In particular, the embodiment in Example 3 worked well in most, if not all the press conditions tested. Additionally, the examples demonstrate that not all the adhesives, backing and treatments of the backing tested worked for all the press conditions tested. With the teachings of the present application, one skilled in the art can select an adhesive, backing and treatment of the backing that would be desirable for the intended press conditions.

The tests and test results described above are intended solely to be illustrative, rather than predictive, and variations in the testing procedure can be expected to yield different results.

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A method of forming a veneer assembly, comprising the steps of:
    a) aligning a first piece of veneer adjacent a second piece of veneer;
    b) applying a veneer tape having a backing and a layer of adhesive disposed on the backing to the juncture between the first piece of veneer and the second piece of veneer so as to form a veneer assembly;
    c) bonding the veneer assembly to a substrate; and
    d) thereafter peeling the backing of the tape from the veneer assembly while a substantial amount of the layer of adhesive remains on the veneer assembly.

2. The method of claim 1, further including the step of:
    e) sanding adhesive from the veneer assembly.

3. The method of claim 1, wherein the tape backing includes a first major surface, a second major surface opposite the first major surface, and wherein the layer of adhesive is disposed on the second major surface of the backing for bonding the tape to the veneer, wherein after step c), the layer of adhesive includes a cohesive strength, and wherein the cohesive strength is such that upon peeling of the backing from the veneer in step d) the layer of adhesive undergoes cohesive separation.

4. The method of claim 3, wherein step d) includes peeling the entire backing in substantially one piece.

5. The method of claim 3, wherein the tape backing includes a delamination strength, and wherein the delamination strength is greater than the cohesive strength of the layer of adhesive.

6. The method of claim 1, wherein step d) includes peeling the backing of the tape from the veneer assembly while substantially all of the layer of adhesive remains on the veneer assembly.

7. The method of claim 6, where wherein the tape backing includes a first major surface, a second major surface opposite the first major surface, and wherein the layer of adhesive is disposed on the second major surface of the backing for bonding the tape to the veneer with a first adhesive strength, wherein the layer of adhesive is bonded to the second major surface of the backing with a second adhesive strength, wherein the layer of adhesive includes a cohesive strength, and wherein after step c):
    1) the cohesive strength is greater than second adhesive strength; and
    2) the first adhesive strength is greater than the second adhesive strength.

8. The method of claim 7, wherein step d) includes peeling the entire backing substantially in one piece.

9. The method of claim 7, wherein the tape backing includes a delamination strength and wherein the delamination strength is greater than the second adhesive strength of the layer of adhesive.

10. The method of claim 1, wherein the layer of adhesive of the veneer tape comprises poly(alpha-olefin) adhesive.

11. The method of claim 1, wherein the layer of adhesive of the veneer tape comprises an acrylic-based adhesive.

12. The method claim 1, wherein the backing of the veneer tape comprises paper.

13. The method of claim 1, wherein the backing of the veneer tape comprises film.

14. The method of claim 1, wherein the first piece of veneer and the second piece of veneer are selected from a group consisting of oak, maple, pine, cherry, walnut, ash, mahogany, teak, birch and hickory.

15. The method of claim 1, wherein step c) further includes applying a pressure of 75–250 psi to the veneer assembly.

16. The method of claim 15, wherein step c) further includes applying the pressure of 75–250 psi for at least 30 seconds.

17. The method of claim 14, wherein step c) further includes applying a temperature of 250° to 325° F. to the veneer assembly.

18. The method of claim 3, wherein step d) includes leaving 30–70% of the layer of adhesive on the veneer assembly.

19. The method of claim 6, wherein step d) includes leaving at least 90% of the layer of adhesive on the veneer assembly.

20. The method of claim 1, wherein prior to step c), the veneer tape is repositionable on the veneer assembly.

* * * * *